US010254553B2

(12) United States Patent
Zuidema et al.

(10) Patent No.: US 10,254,553 B2
(45) Date of Patent: Apr. 9, 2019

(54) METHOD OF PRODUCING A LENTICULAR DEVICE FOR AN AUTOSTEREOSCOPIC DISPLAY APPARATUS

(75) Inventors: Hans Zuidema, Eindhoven (NL);
Henricus J. C. Kuijpers, Haler (NL);
Roel Penterman, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 949 days.

(21) Appl. No.: 12/065,778

(22) PCT Filed: Sep. 8, 2006

(86) PCT No.: PCT/IB2006/053176
§ 371 (c)(1),
(2), (4) Date: Mar. 5, 2008

(87) PCT Pub. No.: WO2007/029206
PCT Pub. Date: Mar. 15, 2007

(65) Prior Publication Data
US 2010/0195203 A1 Aug. 5, 2010

(30) Foreign Application Priority Data
Sep. 9, 2005 (EP) .................................. 05108309

(51) Int. Cl.
*G02B 27/22* (2018.01)
*G02B 3/00* (2006.01)
(Continued)

(52) U.S. Cl.
CPC ......... *G02B 27/2214* (2013.01); *G02B 3/005* (2013.01); *G02F 1/1334* (2013.01);
(Continued)

(58) Field of Classification Search
CPC ................ G02B 27/26; G02B 27/2214; G02B 27/2264; G02B 27/017–27/0172;
(Continued)

(56) References Cited

U.S. PATENT DOCUMENTS 6,069,650 A * 5/2000 Battersby ........................ 348/59
6,486,932 B1 11/2002 Nakao et al.
(Continued)

FOREIGN PATENT DOCUMENTS

EP 0791847 A1 8/1997
EP 1065553 A1 1/2001
(Continued)

OTHER PUBLICATIONS

De Zwart et al., "A 20" Switchable Auto-Stereoscopic 2D/3D Display", Philips Research Laboratories., pp. 1459-1460, (2004).*
(Continued)

*Primary Examiner* — Stephone B Allen
*Assistant Examiner* — Jyotsna Dabbi
(74) *Attorney, Agent, or Firm* — Larry Liberchuk (57) ABSTRACT

A method of producing a lenticular device for an autostereoscopic display apparatus includes providing a substrate having a surface which corresponds in shape to a desired surface profile for the array of lenticular elements, and providing an optical layer mixture of an optically birefringent material and a polymer precursor over the substrate surface. The optical layer is exposed to a stimulus for polymerizing the polymer precursor to have at least a polymer surface layer, thereby enclosing the material between the polymerized material and the surface to define lenticular elements. This method allows a simple polymerization process, forming a single layer, to complete the LC cell formation in the desired lenticular array shape.

12 Claims, 4 Drawing Sheets

(51) Int. Cl.
 *G02F 1/1334* (2006.01)
 *G02F 1/29* (2006.01)
 *G02F 1/1337* (2006.01)

(52) U.S. Cl.
 CPC .. *G02F 1/133707* (2013.01); *G02F 1/133723* (2013.01); *G02F 1/133784* (2013.01); *G02F 1/29* (2013.01)

(58) Field of Classification Search
 CPC .. G02B 27/225; G02B 27/2228; G02B 27/22; G02B 3/005; H04N 13/0404; H04N 13/0497; H04N 13/0409; H04N 13/0434; H04N 13/0239; H04N 13/0055; H04N 13/0296; H04N 13/0431; H04N 2005/2255; H04N 13/00; H04N 13/0221; H04N 13/0037; H04N 13/0048; H04N 13/0051; H04N 13/044; H04N 13/0422; H04N 13/0459; H04N 13/0003; H04N 9/3197; H04N 9/3105; H04N 9/3167; G02F 1/1334; G02F 1/133706; G02F 1/133723; G02F 1/133784; G02F 1/29
 USPC ............... 348/42–60; 353/7–9; 349/8–9, 15
 See application file for complete search history.

(56) References Cited

U.S. PATENT DOCUMENTS

| | | | |
|---|---|---|---|
| 6,788,360 B2 | 9/2004 | Penterman et al. | |
| 6,818,152 B2 | 11/2004 | Penterman et al. | |
| 2004/0247824 A1* | 12/2004 | Faris ............... | C09B 67/0098 428/100 |
| 2007/0053060 A1* | 3/2007 | Jung ............................. | 359/463 |

FOREIGN PATENT DOCUMENTS

| | | | |
|---|---|---|---|
| JP | H09203980 A | 8/1997 | |
| JP | H11271740 A | 10/1999 | |
| JP | 2002053758 A | 2/2002 | |
| WO | WO9821620 A1 | 5/1998 | |
| WO | WO0049452 * | 8/2000 | ........... G02F 1/1333 |
| WO | WO0242832 A2 | 5/2002 | |
| WO | WO0248281 A1 | 6/2002 | |
| WO | WO0248282 A1 | 6/2002 | |
| WO | WO0248783 A2 | 6/2002 | |
| WO | WO02056097 A2 | 7/2002 | |
| WO | WO04070451 A1 | 8/2004 | |
| WO | WO2005006056 A1 | 1/2005 | |
| WO | WO2005015295 A1 | 2/2005 | |

OTHER PUBLICATIONS

"P-94: New Type of LCD with a Single Glass Substrate", Il Kim and Jae-Hoon Kim, SID 02 Digest 2002, pp. 574-577.*
Blibnovl (Electro-optical effects in liquid crystals, Soviet Physics-Usp., vol. 17, No. 5, Mar. 1975, pp. 658-672 ).*
Yang et al (Jpn., J. Appl. Phys. 49, May 20, 2010, pp. 05EA05-01 to 05EA05-5).*
Vogels et al: "16.1 Robust Flexible LCDS With Paintable Technology"; 2004 SID International Symposium, Seattle, WA, May 25-27 2004, Journal of the SID 12/4, 2004, pp. 411-417.
Wang et al: "Different Limits of Phase Separation and Their Applications"; Liquid Crystal Materials, Devices and Applications IX, Proceedings of the SPIE, vol. 5003 (2003), pp. 81-87.
Fan et al: "Electrically Switchable Fresnel Lens Using a Polymer-Separated Composite Film"; Optics Express, Optical Society of America, May 30, 2005, vol. 13, No. 11.

* cited by examiner

METHOD OF PRODUCING A LENTICULAR DEVICE FOR AN AUTOSTEREOSCOPIC DISPLAY APPARATUS

The present invention relates to a lenticular device for an autostereoscopic display apparatus. The display apparatus comprises an image display device for providing a display output composed of rows and columns of pixels, and the lenticular device comprises an array of lenticular elements for directing the outputs from respective groups of pixels in mutually different directions so as to enable a stereoscopic image to be perceived.

Known autostereoscopic display apparatus of this type comprise a matrix LC (liquid crystal) display panel which has rows and columns of pixels (display elements) and which acts as a spatial light modulator to modulate light directed therethrough from a light source. The display panel can be of the kind used in other display applications, for example computer display screens for presenting display information in two dimensional form.

A lenticular sheet, for example in the form of a moulded or machined sheet of polymer material, overlies the output side of the display panel with its lenticular elements, comprising (semi) cylindrical lens elements, extending in the column direction, with each lenticular element being associated with a respective group of two, or more, adjacent columns of display elements and extending parallel with the display element columns.

In an arrangement in which each lenticule is associated with two columns of display elements, the display panel is driven to display a composite image comprising two 2D sub-images vertically interleaved, with alternate columns of display elements displaying the two images, and the display elements in each column providing a vertical slice of the respective 2D (sub) image. The lenticular sheet directs these two slices, and corresponding slices from the display element columns associated with the other lenticules, to the left and right eyes respectively of a viewer in front of the sheet so that, with the sub-images having appropriate binocular disparity, the viewer perceives a single stereoscopic image.

In other, multi-view, arrangements, each lenticule is associated with a group of more than two adjacent display elements in the row direction and corresponding columns of display elements in each group are arranged appropriately to provide a vertical slice from a respective 2-D (sub-) image. As a viewer's head moves, a series of successive, different, stereoscopic views are perceived for creating, for example, a look-around impression. In view of the need for the lenticular elements to be accurately aligned with the display pixels, it is customary for the lenticular screen to be mounted over the display panel in a permanent manner so that the position of the lenticular elements is fixed in relation to the array of pixels.

WO 98/21620 discloses an improvement in the lenticular arrangement which is controllable such that the lens action of the lenticular elements can be switched on and off.

In an "on" setting, the lenticular elements behave as in the conventional arrangement. In the "off" setting, the lenticular elements behave as if they merely form a simple sheet of transparent material. Thus, with the lenticular elements in the off setting, and with the pixels of the underlying display panel being driven to present a 2-D image, this 2-D image is seen by both eyes of the viewer and by utilising all the available columns of pixels in the panel the viewer will see a 2-D image whose horizontal resolution is considerably increased compared with that obtained for each stereo view.

The ability to switch the lenticular elements in this manner enables the display apparatus to be used not only to provide stereoscopic images but to provide also higher resolution 2-D images, as required for text display for example, when desired.

The ability to switch between the settings is achieved by forming the lenticular elements from an electro-optic material, whose refractive index can be altered by the selective application of electrical potential. This material is filled between opposing electrodes which define the desired lenticular shape. A liquid crystal material, generally a nematic liquid crystal, can be used with seals being provided around the periphery of the lenticular array to retain the material. Appropriate orientation layers are also provided.

With no potential applied across the material, the liquid crystal material is oriented such that its refractive index, in the direction of view, differs from, and more particularly is higher that of the material used for the substrates/electrodes, and such that when a predetermined potential is applied to the electrodes, the liquid crystal is oriented such that its refractive index in the direction of view is changed and substantially matches that of the substrates/electrodes.

In this way a lens action of the lenticular elements can effectively be turned on and off.

Figure 1:
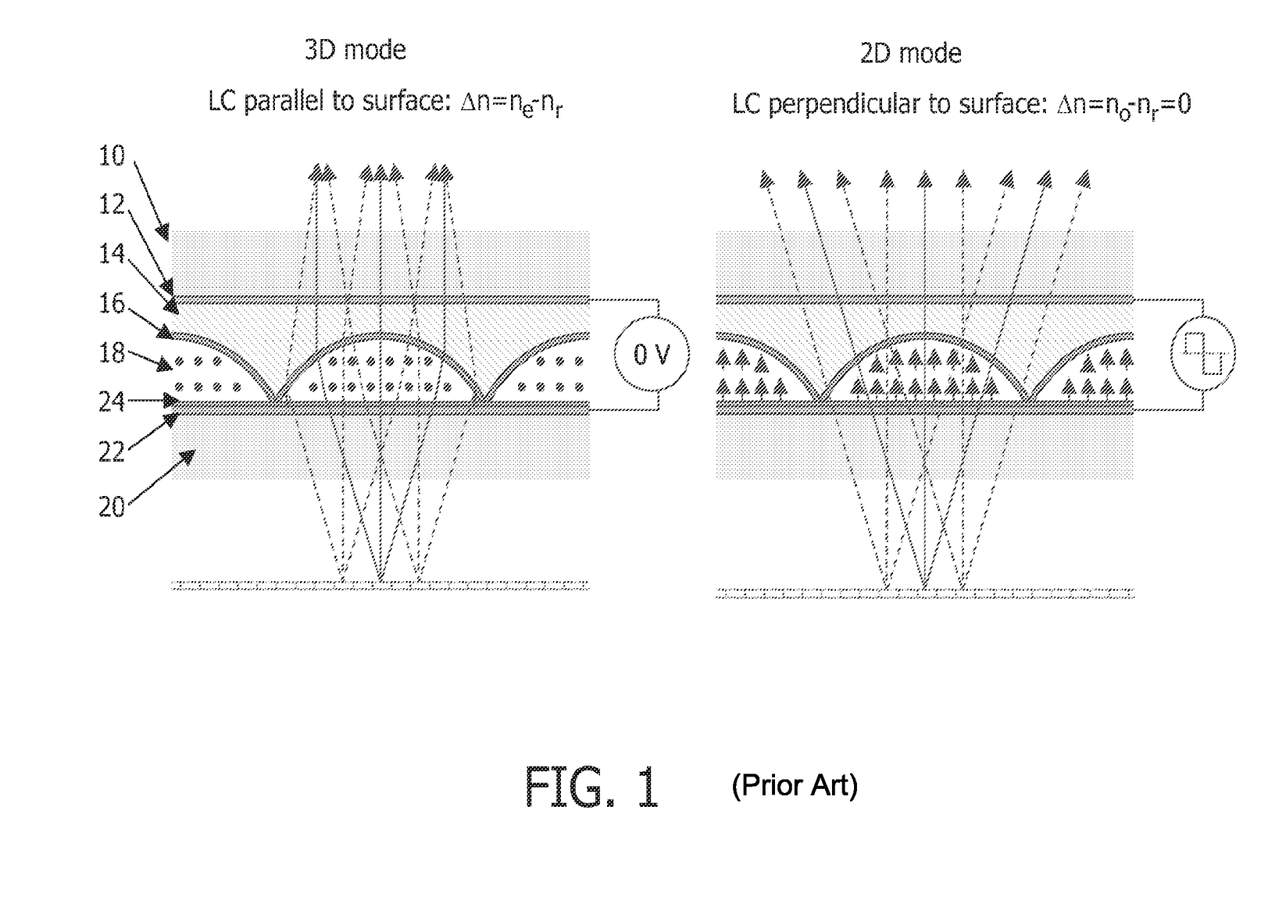
FIG. 1 shows a known design of switchable lenticular lens arrangement.

FIG. 1 shows the known design concept. In FIG. 1, the stack from top to bottom consists of a glass plate 10 coated with ITO 12. On the ITO side, a negative lenticular structure 14 has been applied using a replication technique. This structure has been coated with a (rubbed) polyimide 16, for LC molecule alignment. Inside the negative lenticular structure, LC material 18 is present. The area containing the LC material 18 is closed using a lower glass plate 20 with an ITO electrode layer 22, and coated with a rubbed polyimide layer 24. The two ITO layers 12,22 are used for the control of the LC material.

The lenticular device comprises an array of juxtaposed parallel lenticular elements in the form of convex cylindrical lenses. The lower side is flat while the top side comprises a profiled (convex-ribbed) surface as determined by the contours of the lenticular elements.

FIG. 1 shows the optical effect in the "on" condition, on the left of FIG. 1, and the optical effect in the "off" condition, on the right of FIG. 1. In the "on" 3D mode, the lens focusing (shown schematically) can be seen to have effect. The images of the different pixels associated with the lens are directed in mutually different directions towards a viewer's eyes by virtue of the lens action of the lenticular element so that a viewer sees a different pixel column in each eye. The lens action of the lenticular element forms an image of adjacent pixel columns close to the eye positions. In the "off" 2D mode, the lens action is removed and the viewer sees the image of all pixels with each eye.

Figure 2:
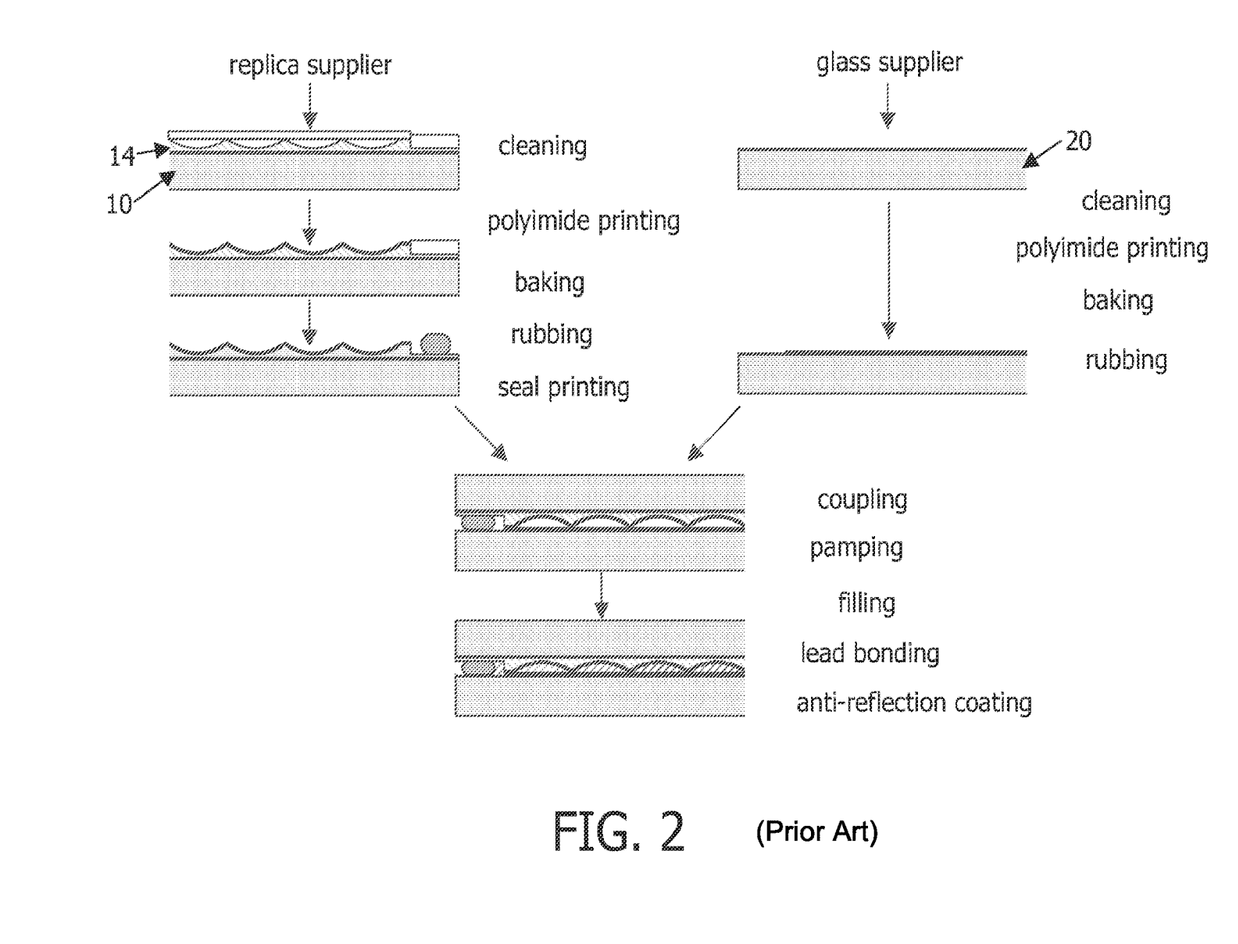
FIG. 2 the known manufacturing method for producing the lens arrangement of FIG. 1.

FIG. 2 shows the conventional manufacturing technique for the structure shown in FIG. 1. The manufacturing technique consists of traditional manufacturing steps that are as well used in, for example, STN-LCD manufacturing.

As shown in FIG. 2, the two glass substrates are processed independently, with cleaning, polyimide printing, baking and rubbing processes, with the seal formed on the substrate carrying the replica lenticular pattern. However, process steps might be slightly different in detail and the seal can be applied on the opposite substrate as well. Conventional cell filling is used to form the LC material between the two substrates, as shown in the lower part of FIG. 2. As shown, this cell formation comprises coupling, pamping, filling, lead bonding and providing an antireflection coating.

There are a number of issues associated with these conventional processes, and which present particular difficulties for forming the lenticular shaped LC layer.

There are difficulties in preventing too much LC material being provided in the lenticular layer, as a result of inaccurate pressing or inaccurate curvature of the lenticular elements. There may instead be insufficient LC material in the lenticular layer, caused by too low vacuum. Filling problems may result in the inclusion of bubbles or vacuum voids in the LC material. The processes also result in a very long filling time for large size switchable lenticular devices (for example of the order of hours). The manufacturing equipment is also expensive, and requires high class clean room facilities.

In addition to problems resulting from the manufacturing requirements, the design itself has some disadvantages. The need for two ITO-coated glass plates gives rise to a minimum distance of the switchable lenticular layer from the display panel, dependent on the thickness of the glass. For large size panels, the standard glass used has a thickness of typically 700 µm, and for small size panels the glass thickness is typically 400 µm. As a result, the distance between the switchable lenticular layer and the underlying display panel cannot be reduced beyond corresponding limits, which dictates the performance of the 3D panel.

The minimal lenticular distance also limits the design freedom for the optics. In addition, the weight of the switchable lenticular arrangement relative to the underlying display panel is significant, as is the additional thickness.

According to the invention, there is provided a method of producing a lenticular device for an autostereoscopic display apparatus, the lenticular device comprising an array of lenticular elements, the method comprising:

providing a substrate having a surface which corresponds in shape to a desired surface profile for the array of lenticular elements;

providing an optical layer mixture of an optically birefringent material and a polymer precursor over the substrate surface; and exposing the optical layer to a stimulus for polymerizing the polymer precursor to form at least a polymer surface layer, thereby enclosing a lenticular element array.

This method allows a simple polymerization process, forming a single layer, to complete the LC cell formation in the desired lenticular array shape. There can be no need for mask exposure steps as part of the polymerization process nor any need for the use of chemically functionalized species. The polymer surface layer can thus be substantially flat and of substantially uniform thickness.

The lenticular elements preferably comprise non-polymerized optically birefringent material, preferably electro-optic material, enclosed between the polymerized material and the substrate surface. The non-polymerized material is then electrically switchable to define switchable lens elements.

The optical layer mixture can be provided by a coating technique such as spin coating or slit coating, or by printing, doctor blade coating or by other techniques. The electro-optical material can comprise a liquid crystal material.

The step of exposing the optical layer to a stimulus can comprise exposing the optical layer to UV radiation.

The method may further comprise manufacturing the substrate having a surface which corresponds in shape to a desired surface profile for the array of lenticular elements, by:

providing a glass substrate;

providing a transparent conductive layer over the glass substrate; and providing a replica layer having as its upper surface the surface which corresponds in shape to a desired surface profile for the array of lenticular elements.

The transparent conductive layer (e.g. ITO) acts as one of the control electrodes for the switchable lenticular device.

The manufacture of the substrate having the surface which corresponds in shape to a desired surface profile for the array of lenticular elements may further comprise:

providing a polyimide layer over the surface; and baking and rubbing the polyimide layer.

A transparent conducting layer (e.g. ITO) can be applied over the discrete polymer surface layer, to define a second control electrode for the switchable lenticular device.

The invention also provides a lenticular device for an autostereoscopic display apparatus, the lenticular device comprising:

an array of lenticular elements formed of a mixture of an optically birefringent material and a polymer precursor, the array of lenticular elements extending between a substrate, having an upper surface which corresponds in shape to the curved lenticular element surfaces, and a polymer top layer formed by polymerization of a portion of the polymer precursor of the mixture.

Again, the polymer surface layer can be substantially flat and of substantially uniform thickness.

The invention also provides an autostereoscopic display device, comprising:

a display device for providing a 2-dimensional output image, or a plurality of 2-dimensional output images for conversion to a stereoscopic image; and a switchable lenticular device of the invention.

Embodiments the invention will now be described, by way of example, with reference to the accompanying drawings, in which.

It should be understood that the Figures are merely schematic and are not drawn to scale. In particular, certain dimensions may have been exaggerated whilst other have been reduced. The same reference numerals are used throughout the drawings to indicate the same or similar parts.

The invention provides a manufacturing process for a switchable lenticular device for use in an autostereoscopic display device, and which uses a liquid crystal material, which is formed without the need for a vacuum filling process. Instead, a printing or spin coating (or similar) method can be used for the liquid crystal cell formation.

The applicant has developed the basic technology in the context of general liquid crystal display manufacture, and a brief discussion of this new technology will now be presented. EP1065553A1 describes the technology in further detail.

The proposed use of the technology to date is for the formation of a stratified (i.e. segmented) light modulation layer.

A layer of a mixture of a polymer precursor and a liquid crystal (LC) material is deposited on a transparent substrate carrying an orientation layer, after which the mixture is exposed to UV light in a photolithographic step. In this step, the polymer precursor is polymerized to form sidewalls between the desired pixels of the LCD. Subsequently, the rest of the mixture is exposed to UV light. This triggers a phase separation in which the polymer precursor is polymerized to form a continuous top layer on top of the LC material. As a result, the LC material is trapped between the polymer top layer, the polymer sidewalls and the substrate, thus forming a plurality of LC-filled polymer capsules on the substrate. The polymer top layer serves as a second substrate.

This process allows the layer of a mixture of a polymer precursor and a liquid crystal (LC) to be applied by a coating process, which simplifies and reduces the cost of the fabrication process. It also enables the second substrate to be thinner than the conventional glass substrate. The polymerization process forms cavities for each liquid crystal pixel, so that pixel alignment is provided and the body of liquid crystal for each pixel is trapped in position.

A drawback of this method is that several photolithography steps are required to form the separate LC pixels, and the development and production of masks is costly. These photolithography steps are required in particular to define the polymerized side walls of each pixel. Furthermore, this process requires a number of different UV exposure steps, of different wavelengths and intensities, in order to define side walls which penetrate the full depth of the mixture, and a top shallow surface layer of polymerized material.

The applicant has also proposed in WO 2005/015295 an alternative process in which a single exposure step is required. In this process, a stamping process is used to selectively deposit a chemically functionalized species over the substrate. This gives parts of the substrate a high affinity for the polymerizable material of the mixture (in particular a high affinity to partially polymerized material). During a single UV irradiation step, the high affinity regions result in the polymerization concentrating at those regions of the mixture. When the mixture is partially polymerized, non-polymerized liquid tends to concentrate at the spaces between the high affinity regions, thereby defining the liquid crystal cells, whereas the polymerized parts of the mixture concentrate at the top surface (where the irradiation intensity is greatest) and at the high affinity regions, thereby defining side walls.

This process simplifies the UV irradiation process, but still requires accurate alignment of the stamp used to deposit the functionalized species.

The concepts and technology underlying the techniques outlined above have been modified to provide a process for the manufacture of a lenticular device for an autostereoscopic display device. The process of the invention will now be described with reference to FIG. 3.

Figure 3:
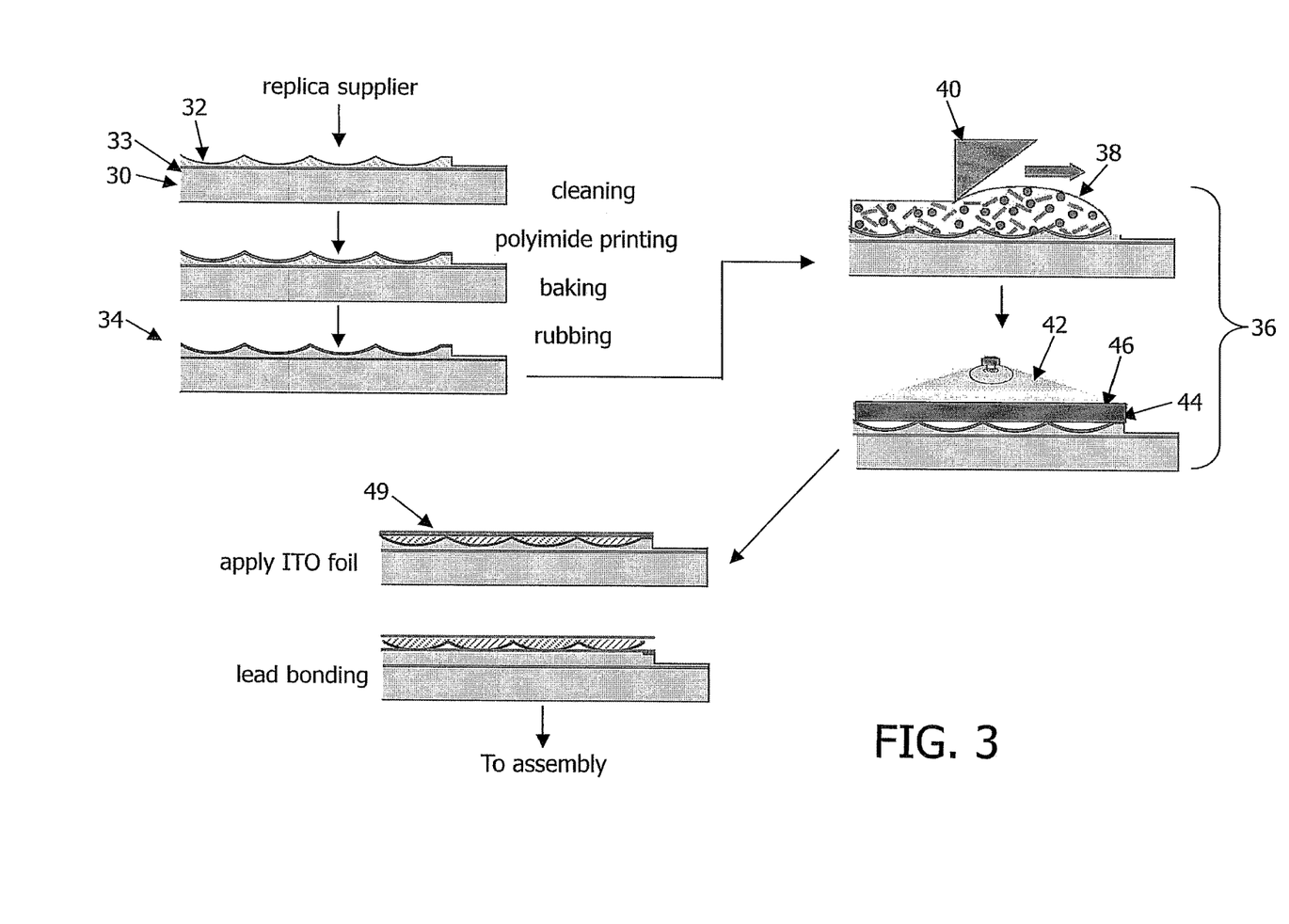
FIG. 3 shows the manufacturing method for producing a lens arrangement of the invention, and shows the lens arrangement of the invention.

The lenticular device comprises a single ITO glass substrate which is provided with the replica lens template 32 which defines the lens surface shape. The glass substrate 30 (under the replica) is coated with an ITO electrode layer 33. Again, after cleaning, polyimide printing, baking and rubbing is carried out to define the LC alignment layer. The polyimide may be provided by printing, spin coating, or other standard processing steps.

Standard processing steps are thus used from the LCD industry to define the substrate 34 ready for the printing process.

The paintable/printable LC process 36 is then used to created LC-material filled lenticular elements.

This process comprises the coating of the substrate using the mixture 38 of LC material, a monomer and other components. The coating can be carried out using a doctor blade 40, although other coating technologies can be used.

When the mixture is exposed with UV-light 42 the monomers are converted into polymer, which leads to the separation of the polymer phase from the LC material. This creates two layers, the lower one 44 containing the LC material, and the upper one 46 containing the polymer which is (approximately) 15 μm thick A lenticular structure containing LC material is thus created.

A counter electrode then is formed, for example by application of an ITO foil 49, which is applied on top of the polymer film. This is appropriate for a stand alone version. However, when the switchable lenticular is used on top of a display, the ITO can be integrated into a polarizer structure. Other options and/or designs are as also possible.

The resulting structure can be used in the same way and in the same applications as the existing switchable lenticular device technology. As shown, the structure is pass to an assembly plant for assembly with an underlying display device.

This process prevents the use of excessive amounts of LC material in the lenticular layer because of the simplified filling process, which comprises an accurately controllable coating process. Problems associated with the use of a vacuum are avoided, including the processing time required, and the LC mixture can easily be made bubble free.

The process enables a reduction in the number of expensive processing steps, such as alignment, coupling, pamping and filling. Some of these steps are replaced by a coating step and an exposure step. This may also enable the processing equipment conditions to be relaxed (clean room requirements).

The lenticular device can be placed against the underlying display with the polymer layer against the display device output surface. This polymer layer has a thickness in the region of 15 μm, and this enables the optical performance to be improved. The use of a single glass substrate enables overall weight and thickness reduction.

The LC layer thickness can be used as a design parameter. By varying the amount of LC material in the mixture, several designs for the stack can be created. There are essentially three options:

(i) The polymer layer is not in contact with the replicated structure. In this case the LC material can freely flow through the painted switchable lenticular upon mechanical loading.

(ii) The polymer layer is just in contact with the replicated structure. In this case, the polymer layer closes each lenticular element of the replicated structure.

(iii) The polymer layer closes each lenticular element of the replicated structure and extends partly into the lenticular element cavity. In this case, a mechanical fixture is present between the replicated structure and the polymer film across the entire lenticular array. As a result, the stack becomes mechanically more stable.

These three design possibilities can be selected by adjusting the amount and/or composition of the mixture of monomer and LC material as well as the polymerization process conditions.

There are advantages to the use of a single glass plate, as explained above. The invention can however provide advantages even when two glass plates are to be maintained. In this case, after the application of the mixture of monomer and LC material, a second ITO coated glass plate is coupled with the mixture. The process flow for the painted switchable lenticular is then applied, of UV-based polymerisation and resulting phase separation, In this way, the second ITO containing glass plate is mechanically coupled by the polymer with the lower part of the stack. As a result, a similar design is obtained as the conventional LC fluid containing switchable lenticular described with reference to FIG. 2. However, the vacuum filling technology is still avoided.

Figure 4:
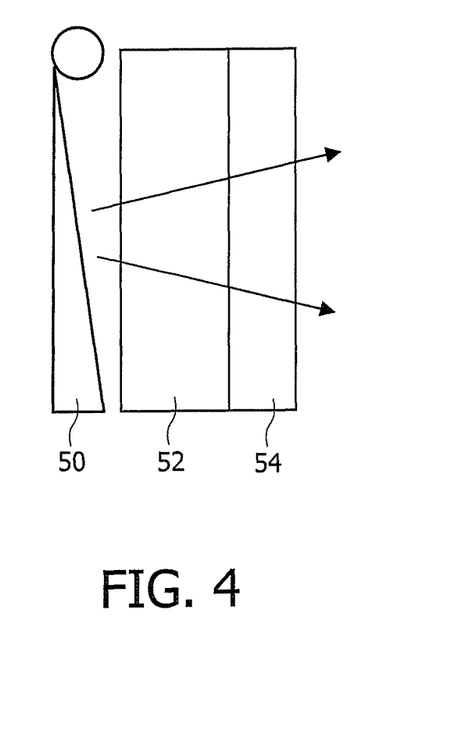
FIG. 4 shows a display device of the invention.

FIG. 4 shows the lenticular device of the invention formed on the surface of a conventional 2-dimensional display device. For example the display device 52 may be a conventional active matrix liquid crystal display device, provided with a backlight 50. The lenticular device is shown as 54. The mounting of the device 54 to the front surface of the display device may be achieved in different ways, as will be apparent to those skilled in the art.

The display driving technique to provide stereo images will be as in for conventional switchable lenticular arrangements, and will also be known to those skilled in the art.

The description above concerns only one detailed example of switchable lenticular device. Modifications to the design are of course possible. For example, the displays can be partly switchable. This requires segmented electrodes, and this then enables part of the display to be operating in 2D mode (with higher resolution) and part of the display to be operating in 3D mode (with lower resolution).

In the example above, the application of voltage gives rise to the 2D mode, and the 3D mode is the default mode with no voltage applied. It is of course possible to change the design so that the application of voltage to the lenticular device creates the 3D mode. This requires a different type of LC material, particularly negative refractive index change material, which is homeotropically oriented.

The example above shows a negative (concave) replicated structure. However, a positive (convex) structure can equally be used.

The painted LC material based switchable lenticular device can be directly applied on the colour filter plate of the underlying display device, instead of a separate glass plate. As a result of the reduced thickness of the painted lenticular device, it is possible to stack several lenses (each with only one glass substrate), thus creating a multi-focal lenticular lens device.

In the above described embodiment, the lenticular device has an array of elongate, cylindrical, lenticular elements. It will be understood that the lenticular sheet could instead comprise an array of spherical micro lens elements instead, such spherical lens elements lenticular sheets already being known in the field of autostereoscopic display apparatus.

Also, the lenticular elements need not extend parallel to the pixel columns but could instead be slightly slanted with respect to the pixel columns, as described in EP-A-0 791847.

In the example given above, the phase-separation of the material that provides the top seal to the LC layer is induced by UV radiation. It may, however, also be possible to use solvent or temperature induced phase-separable material.

As also mentioned above, the polymeric stratified-phase-separated composite is known in the art, as well as the method of producing such materials. Reference is made to U.S. Pat. No. 6,486,932, WO 02/42832, WO 02/48281, WO 02/48282 and WO 02/48783.

By way of example, a suitable composition (which is also disclosed in the article "Robust flexible LCDs with paintable technology" of Joost Vogels et al, in The Journal of the SID Dec. 4, 2004) is as follows:

50 weight percent (wt %) of a liquid crystal mixture, for instance the mixture E7, which is marketed by Merck;

44.5 weight percent (wt %) of photo-polymerizable isobornylmethacrylate (supplied by Sartomer); and 4.5 weight percent (wt %) of a stilbene dimethacrylate dye:

The synthesis of this has been disclosed in PCT patent application WO 02/42382 and which is hereby incorporated by reference, the two acrylates being the polymer precursor; and 0.5 weight percent (wt %) of benzildimethylketal, which is marketed by Ciba-Geigy under the trade name Irgacure 651.

The UV exposure of this material to provide the polymerization may for example involve exposing the layer to UV light with a light intensity of around 0.1 mW/cm² for 30 minutes at 40° C.

The inclusion of a compound having a chromophore strongly absorbing in the UV region of the electromagnetic spectrum, i.e., the stilbene dimethacrylate dye in the example above, causes the desired gradient in the UV intensity through the layer. This effect may be amplified by the UV absorptions of the other components of the liquid, like the other components of the polymer precursors and the electro-optical materials. Consequently, the polymerization reaction predominantly takes place at the surface facing the UV source.

When other stimuli for triggering the polymerization reaction are used, care has to be taken that the polymerization reaction predominantly takes place at the surface.

The example above provides optically switchable lens elements. An alternative way to provide a switchable lenticular arrangement for autostereoscopic displays is to have non-switchable lens elements, but which have different responses to different light polarizations. A polarization switch arrangement can then control the state of the lenticular device. This polarization switch can be implemented as a switchable LC device in series with the lenticular arrangement. This approach is described in detail in WO 04/070451, and the method described above can be used to form the lenticular arrangement, for example by providing full polymerization of the LC material mixture.

It should thus be apparent that the above-mentioned embodiments illustrate rather than limit the invention, and that those skilled in the art will be able to design many alternative embodiments without departing from the scope of the appended claims.

The invention claimed is:

1. A method of producing a lenticular device for an autostereoscopic display apparatus, the lenticular device comprising an array of lenticular elements, the method comprising:

applying an optical layer mixture of an optically birefringent material and a polymer precursor over a surface of a substrate, the surface of the substrate corresponding in shape to a desired surface profile for the array of lenticular elements, such that one side of the optical layer mixture assumes the shape of said desired surface profile for the array of lenticular elements by conforming to the surface of the substrate; and exposing another side of the optical layer mixture to a stimulus for polymerizing the polymer precursor to form at least a polymer surface layer that is substantially flat relative to the desired surface profile for the array of lenticular elements, and that has a depth that reaches beyond peaks of the surface of the substrate and extends only partly into a cavity of each lenticular element of the array, thereby forming a mechanical fixture across the entire array of lenticular elements and enclosing the array of lenticular elements to form a plurality of polymer capsules filled with the birefringent material.

2. The method as claimed in claim 1, wherein the lenticular elements comprise non-polymerized electro-optic material enclosed between the polymerized material and the substrate surface.

3. The method as claimed in claim 1, wherein the polymer surface layer is of substantially uniform thickness relative to the desired surface profile for the array of lenticular elements.

4. The method as claimed in claim 1, wherein the optical layer mixture is applied by a coating process.

5. The method as claimed in claim 1, wherein the optical layer mixture is applied by printing.

6. The method as claimed in claim 5, wherein the optical layer mixture is applied using a doctor blade.

7. The method as claimed in claim 1, wherein the optically birefringent material comprises a liquid crystal material.

8. The method as claimed in claim 1, wherein exposing the optical layer to a stimulus comprises exposing the optical layer to UV radiation.

9. The method as claimed in claim 1, further comprising manufacturing the substrate having a surface, which corresponds in shape to a desired surface profile for the array of lenticular elements, by:
   providing a glass substrate;
   providing a transparent conductive layer over the glass substrate; and
   providing a replica layer having as its upper surface the surface which corresponds in shape to a desired surface profile for the array of lenticular elements.

10. The method as claimed in claim 9, wherein the manufacture of the substrate having the surface which corresponds in shape to a desired surface profile for the array of lenticular elements further comprises:
    providing a polyimide layer over the surface; and
    baking and rubbing the polyimide layer.

11. The method as claimed in claim 1, further comprising applying a transparent conducting layer over the polymer surface layer.

12. The method as claimed in claim 11, wherein the transparent conducting layer comprises ITO.

* * * * *